Patented Aug. 21, 1928.

1,681,237

UNITED STATES PATENT OFFICE.

JOSEPH HIDY JAMES, OF PITTSBURGH, PENNSYLVANIA, ASSIGNOR TO CLARENCE P. BYRNES, TRUSTEE, OF SEWICKLEY, PENNSYLVANIA.

INSOLUBLE SOAP AND METHOD OF MAKING AN INSOLUBLE SOAP FROM ALDEHYDE FATTY ACID MIXTURES OF MINERAL OIL.

No Drawing. Application filed March 7, 1919. Serial No. 281,197.

In my copending application Serial No. 435,355, filed January 26, 1921, for partial combustion methods for treating aliphatic hydrocarbons, I have described partial combustion or oxidation methods for producing aldehyde fatty acids from ordinary straight-chain hydrocarbons occurring in petroleum, shale oil, or oils produced by the low temperature distillation of bituminous or cannel coals. In the said process, the liquid hydrocarbon is vaporized, mixed with air or an oxygen-containing gas in regulated proportions, near the theoretical combining proportion or preferably in excess thereof; and the hot mixture is passed, with or without the addition of a diluting gas such as steam, through a relatively thin layer or through successive relatively thin layers of catalytic material under a regulated temperature, preferably below 500° C. The catalysts employed are preferably complex oxides or compounds of metals having a varying valence, such, for example, as the blue oxides of molybdenum. The products of this partial-combustion or partial-oxidation process are then condensed, giving a mixture of partial-oxidation products, ranging from alcohols, through aldehydes to aldehyde fatty acids. The process may be varied to produce more or less of the aldehyde fatty acids and of aldehydes. The products thus obtained consist of a solution containing different aldehyde fatty acids mixed with aldehydes and unconverted hydrocarbons, the following being a typical example:—

| | Per cent. |
|---|---|
| Aldehyde fatty acids | 70 |
| Aldehydes | 25 |
| Hydrocarbons and undetermined | 5 |

These substances are soluble in each other through a wide range of proportions.

The object of the present invention is to separate the aldehyde fatty acids from the mixture and form industrial or commercial products from the aldehyde fatty acids. In the preferred form of my method the production of compounds of the acids, and their separation from the rest of the mixture, are carried out in the same steps, though they may be carried out separately as later set forth.

In the preferred form soluble metallic salts of the aldehyde fatty acids are formed; and the residual aldehydes and hydrocarbons are preferably returned for conversion into aldehyde fatty acids by the process of the application above referred to. For example, if insoluble or slightly soluble soaps are desired, the solution or mixture of aldehyde fatty acids, aldehydes and hydrocarbons is agitated (preferably hot) with the hydroxide of the metal (such as lead or aluminum) until the aldehyde fatty acids have combined to form an insoluble or slightly soluble metallic soap. If a soluble salt of the metal is used, the reaction will be more rapid at first, but on account of the liberation of free mineral acid, metallic hydroxide should be added from time to time for its neutralization. The soap is then removed as for example by filtering, and the residual solution or mixture of aldehydes, hydrocarbons, etc., is recovered.

A more rapid form of the above method is obtained by adding a sufficient quantity of a solvent such as alcohol, to dissolve both the mixture and the metallic salt added. This solvent should be added before the metallic hydroxide (or metallic salt and metallic hydroxide) is added as above. When the reaction is completed (which may be hastened by warming) the alcohol is easily distilled off and the soaps removed by filtration or decantation.

When soluble alkali metal soaps of the aldehyde fatty acids are desired, such as sodium soap or potassium soap, the original mixture, containing a series of aldehyde fatty acids, aldehydes and hydrocarbons, is agitated with a water solution of the hydroxide, carbonate, or bicarbonate of the alkali metal. Heating will hasten the reaction, but a better color is obtained in the soap by carrying out the reactions at ordinary temperatures, this taking a longer time. When the reaction of neutralization has proceeded sufficiently near to completion, the agitation is stopped and the two liquids separate into layers.

The water solution of the aldehyde fatty acid soap comprising the lower layer can be drawn off, leaving the solution mixture of aldehydes, hydrocarbons, etc.

I may cause a more rapid saponification by first dissolving the original mixture of aldehyde fatty acids, aldehydes and hydrocarbons in alcohol and adding, either in the solid form or in a water solution or alcoholic solution, the carbonate, hydroxide, or bicarbonate of the desired alkali metal to be used. As before the reaction may be hastened by heating.

When the reaction is completed, the alcohol can be recovered by distillation, and the solid or pasty soaps separated from the unchanged oily residuum by filtration or by first dissolving in hot water and separating, as in the above example of making insoluble soaps.

I have also found another practicable and economic procedure for separating the aldehyde fatty acids in the form of their alkaline metal salts (soap). In this process, the reaction mixture (aldehyde fatty acids, aldehydes, hydrocarbons, etc.) is heated to a suitable temperature, say above 100° C., with the addition of dry solid hydroxide, carbonate or bicarbonate of the particular metal, the salt of which is desired. The mixture is preferably agitated during this step, either by mechanical or convection current devices.

The soap formed in this reaction will largely separate from the mixture on cooling, and can be removed mechanically, fresh mixture being added and the treatment continued as long as possible. The non-saponifiable matter is preferably taken back to the oxidation process for re-treatment into aldehyde fatty acids.

In the same manner (dry addition with heating), I can prepare insoluble metallic soap, the addition in this case being preferably that of approximately equimolecular proportions of the chloride or other salt of the metal and the hydroxide. The metallic soap separating on cooling can be easily removed mechanically and the treatment continued with fresh additions of the mixture as long as practicable.

In the above examples, the acid compounds are formed before or during separation from the aldehydes, hydrocarbons, etc. I may, however, within my broader claims, separate the aldehyde fatty acids from the remainder of the original mixture before forming their compounds. Thus, I may distill off the aldehydes and hydrocarbons, which are more volatile than the aldehyde fatty acids, and then treat the separated acids to form their compounds. The distillation may be carried out with or without the aid of steam or other diluent.

An example of the aldehyde fatty acids used when my process described in application Serial No. 272,567 is used, is Pennsylvania petroleum distillate boiling between 250 and 325° C., and having at 20° C. a specific gravity of .8125. Some of the aldehyde fatty acids obtained are as follows:

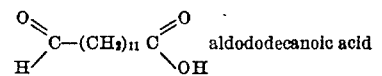 aldododecanoic acid

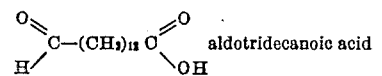 aldotridecanoic acid

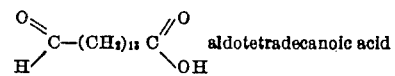 aldotetradecanoic acid

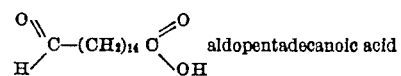 aldopentadecanoic acid

On saponifying the mixture containing these acids, I obtain their sodium salts or soaps as in the following example.

A mixture of my partial oxidation products from Pennsylvania gas oil containing approximately 25% aldehyde fatty acids, free and combined, was used. This was boiled in a pressure kettle fitted with a mechanical stirring apparatus, the temperature being about 150° C.

The first charge was seven liters of partial oxidation product; 70 grams of caustic soda; 500 cubic centimeters of water. This mixture was boiled for three hours in the pressure kettle with stirring. There resulted one liter of soap (jelly) which was separated. On taking the non-saponifiable material from the first charge (oily layer) and boiling it in the same kettle with 70 grams of caustic soda and 500 cubic centimeters of water, no soap jelly was separated, but the soap was dissolved in the oily layer. On repeating the operation with the oily layer under the same conditions, the water layer was found to contain no soap.

Again on charging seven liters of fresh partial oxidation product, together with the water layers from the second and third charges, and boiling at 150° in a pressure kettle for two hours, there resulted one and one-half liters of soap fully separated.

The oil from the fourth charge was then boiled with 100 grams of caustic soda and 500 grams of water for two hours at 150°; and no soap layer separated. Another charge was then made up with seven liters of fresh partial oxidation product and the water layer from the fifth charge. This was boiled for two hours and one and one-half liters of soap fully separated.

It was found in later experiments that if a caustic soda of a strength resulting from 100 grams of caustic soda to 250 grams of water be used, the soap could be separated more easily.

Many variations may be made in carrying out the process without departing from my invention, as defined in the process claims.

I claim:

1. The method of treating a partial oxidation product of mineral oil containing aldehyde fatty acids, consisting in separating the aldehyde fatty acids from the other constituents of the partial oxidation product, and forming substantially insoluble soaps of said acids.

2. In the treatment of a mixture of aliphatic hydrocarbons containing oxygenated aldehyde acids and other less oxidized constituents, the step consisting of separating at least part of said acids from the other constituents and forming substantially insoluble soaps therefrom.

3. In the treatment of a liquid partial oxidation product containing alcohols, aldehyde-like bodies and oxygenated aldehyde acids, the step consisting of separating at least part of said acids from the other constituents and forming substantially insoluble soaps therefrom.

4. The method treating a partial oxidation product of hydrocarbon oils containing aldehyde fatty acids, consisting in separating the aldehyde fatty acids from the other constituents of the partial oxidation product by means of a solvent, forming substantially insoluble soaps of said acids, and recovering the solvent and removing the soaps.

5. The method of treating a partial oxidation product of hydrocarbon oils containing aldehyde fatty acids, consisting in separating the aldehyde fatty acids from the other constituents of the partial oxidation product, forming soluble soaps from said acids, and them converting said soaps into substantially insoluble soaps.

6. A substantially insoluble soap containing insoluble salts of aldehyde fatty acids.

7. A substantially insoluble soap containing a mixture of insoluble salts of aldehyde fatty acids of varying molecular weights.

In testimony whereof, I have hereunto set my hand.

JOSEPH HIDY JAMES.